J. SCHIESSLER.
ELECTRIC CAPACITATIVE INDUCTIVE COUPLING.
APPLICATION FILED DEC. 23, 1912.
1,116,130. Patented Nov. 3, 1914.
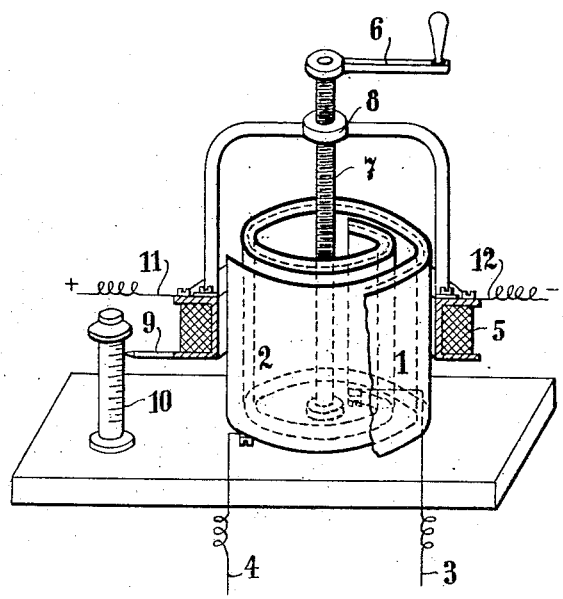

UNITED STATES PATENT OFFICE.

JOSEF SCHIESSLER, OF BADEN, NEAR VIENNA, AUSTRIA-HUNGARY.

ELECTRIC CAPACITATIVE-INDUCTIVE COUPLING.

1,116,130.  Specification of Letters Patent.  Patented Nov. 3, 1914.

Original application filed November 23, 1910, Serial No. 593,890. Divided and this application filed December 23, 1912. Serial No. 738,304.

*To all whom it may concern:*

Be it known that I, Dr. JOSEF SCHIESSLER, subject of the Emperor of Austria-Hungary, residing at Baden, near Vienna, Austria-Hungary, have invented certain new and useful Improvements in Electric Capacitative-Inductive Couplings, of which the following is a specification, and is a division of my application, Serial No. 593,890, filed November 23, 1910.

This invention relates to an electric capacitative-inductive, that is to say an electrostatic-magnetic coupling, suitable for connecting the primary and secondary circuits of telegraphic and telephonic systems.

The improved coupling possesses all the advantages of capacitative and inductive coupling so that the energy supplied is transmitted out of the primary system into the secondary system both by the electrical as well as by the magnetic field. A condenser forming one part of the coupling may be placed in the primary system and an induction coil forming another part of the coupling can be included in the secondary system or vice versa. According to the method of connection and the thickness of the wire in the coil either of these arrangements may be employed. Naturally only the first arrangement is employed at transmitting stations, but at receiving stations the second arrangement may be used if necessary or desired.

The accompanying illustrative drawing shows a construction of electric inductive coupling according to the invention, comprising for example a hollow cylindrical condenser the plates 1 and 2 of which are wound into spiral form and are separated from each other by a dielectric. The pole or terminal wires 3 and 4 are adapted to be connected either in series or parallel with the current circuit or the vibrating circuit of a system of telegraphic or telephonic apparatus. Concentric with the hollow cylindrical condenser and arranged outside it is a coil 5 which is adjustable in the direction of the axis of the condenser. The adjustment by which an alteration in the degree of coupling is produced may be effected for example as shown by means of a screw spindle 7 adapted to be rotated by a crank handle 6 and upon which is mounted an internally screw threaded nut or sleeve 8 that carries the coil 5. A pointer 9 connected to the sleeve 8 indicates on a scale 10 the degree of coupling. The arrangement is obviously only represented by way of example and other arrangements can likewise be adopted without departing from the scope of the invention. The condenser may be variable as a telescope-condenser or the induction coil may be an adjustable one.

It is obvious that the form of the condenser (plate condenser, cylindrical condenser, etc.) or the number of plates used, or their connection as high tension or low tension plates is immaterial. The connection too, may vary according to the effect to be obtained. When the arrangement is used as a coupling device, it is used in the manner of a transformer, the condenser being loaded by an alternating current, and the induction coil connected to an indicator device e. g. a telephone or the like; or the alternating current may pass through the induction coil while the condenser is connected with the telephone.

The mode of operation of the arrangement is the following: The alternating current or the intermitting direct current is fed to the condenser plates 1 and 2 and there an electric alternating field is produced, electric lines of force passing from one condenser plate to the other and alternately being produced and vanishing there. This electric field produces in this case a cylindrical magnetic field in a direction perpendicular to its own, which in its turn generates a cyclic electric field perpendicular to itself and therefore an induction current in the coil 5 which passes the winding of the coil and the apparatus switched in the circuit connected to the conductors 11 and 12 which are leading from the coil. The farther the coil 5 is pushed over the condenser plates 1 and 2 by manipulation of the crank handle 6 and the screw spindle 7 the closer will be the coupling and the more intense will be the current in the coil until the maximum is attained in the middle position. The pointer 9 enables the degree of coupling to be easily read off on the scale 10.

I claim:

1. A capacitative inductive connection, comprising two members, one an inductive coil and the other spiral condenser plates, and means to adjust one of the members relatively to the other.

2. A capacitative inductive connection comprising an inductive winding, a carrier for the same, a screw by which said carrier and winding are adjusted, spiral condenser plates within the winding, an index on the carrier and a scale for the index.

In testimony whereof I have hereunto set my hand in presence of two subscribing witnesses.

Dr. JOSEF SCHIESSLER.

Witnesses:
 Ada Maria Berger,
 August Fugger.